(12) United States Patent
Kondoh et al.

(10) Patent No.: US 11,321,936 B2
(45) Date of Patent: May 3, 2022

(54) IMAGE PROCESSING DEVICE, IMAGE PROCESSING METHOD, AND STORAGE MEDIUM STORING PROGRAM

(71) Applicant: NEC CORPORATION, Tokyo (JP)

(72) Inventors: Katsuhiko Kondoh, Tokyo (JP); Satoshi Segawa, Tokyo (JP); Yuichi Nakatani, Tokyo (JP); Michiru Sugimoto, Tokyo (JP); Yasushi Hidaka, Tokyo (JP); Junya Akiyama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/976,639

(22) PCT Filed: Mar. 27, 2019

(86) PCT No.: PCT/JP2019/013319
§ 371 (c)(1),
(2) Date: Aug. 28, 2020

(87) PCT Pub. No.: WO2019/194051
PCT Pub. Date: Oct. 10, 2019

(65) Prior Publication Data
US 2021/0012138 A1    Jan. 14, 2021

(30) Foreign Application Priority Data
Apr. 2, 2018    (JP) .............................. JP2018-071140

(51) Int. Cl.
*G06V 10/40*    (2022.01)
*G06V 30/418*    (2022.01)
*G06V 30/10*    (2022.01)

(52) U.S. Cl.
CPC ............ *G06V 10/40* (2022.01); *G06V 30/418* (2022.01); *G06V 30/10* (2022.01)

(58) Field of Classification Search
None
See application file for complete search history.

(56) References Cited

U.S. PATENT DOCUMENTS 8,724,907 B1 * 5/2014 Sampson ........... G06K 9/00483
382/218
8,831,361 B2    9/2014 Pintsov

FOREIGN PATENT DOCUMENTS

| JP | 05-258099 A | 10/1993 |
| JP | 09-223187 A | 8/1997 |
| JP | 2014-182477 A | 9/2014 |

OTHER PUBLICATIONS

International Search Report of PCT/JP2019/013319 dated Jun. 11, 2019 [PCT/ISA/210].

(Continued)

*Primary Examiner* — Edward Park

(57) ABSTRACT

An image processing device including: a first feature quantity selecting unit configured to select a first feature quantity of a document image that is a character recognition target among first feature quantities that are recoded in advance and represent features of character strings of an item; a character recognition processing unit configured to perform a character recognition process for the document image; a character string selecting unit configured to select a character string of a specific item corresponding to the first feature quantity among the character strings acquired as a result of the character recognition process; and a determination result acquiring unit configured to acquire a determination result indicating whether or not a character string that has been input in advance matches the character string of the specific item in a case in which the character string selecting unit has not selected any one of the character strings.

6 Claims, 11 Drawing Sheets

(56) References Cited

OTHER PUBLICATIONS

Extended European Search Report for EP Application No. EP19781968.3 dated Apr. 23, 2021.

\* cited by examiner

FIG. 5

<STORAGE TABLE>

| SLIP ID | IMAGE DATA | RECORDING CHAR-ACTER STRING 1 | RECORDING CHAR-ACTER STRING 2 | RECORDING CHAR-ACTER STRING 3 | RECORDING CHAR-ACTER STRING 4 |
|---|---|---|---|---|---|
| ⋮ | ⋮ | ⋮ | ⋮ | ⋮ | ⋮ |
| ⋮ | ⋮ | ⋮ | ⋮ | ⋮ | ⋮ |
| ⋮ | ⋮ | ⋮ | ⋮ | ⋮ | ⋮ |

IMAGE PROCESSING DEVICE, IMAGE PROCESSING METHOD, AND STORAGE MEDIUM STORING PROGRAM

CROSS REFERENCE TO RELATED APPLICATIONS

This application is a National Stage of International Application No. PCT/JP2019/013319, filed Mar. 27, 2019, claiming priority to Japanese Patent Application No. 2018-071140, filed Apr. 2, 2018, the contents of all of which are incorporated herein by reference in their entirety.

TECHNICAL FIELD

The present invention relates to an image processing device, an image processing method, and a storage medium storing a program.

BACKGROUND ART

In relation to character recognition, in an OCR input checking/correcting method disclosed in Patent Literature 1, calculation logs are prepared using a method different from that of the character recognition. In this method, in a case in which calculation logs and OCR read data match each other and there is no mismatching, reading is skipped up to a received order table in which the next error is present without screen display.

CITATION LIST

Patent Literature

[Patent Document 1]
Japanese Unexamined Patent Application, First Publication No. H09-223187

SUMMARY OF INVENTION

Problem to be Solved by the Invention

Not only in a case in which data such as calculation logs acquired in advance and data acquired through an OCR process match each other, but also in the other cases, it is preferable to reduce an operator's burden regarding checking results of the OCR process.

An object of the present invention is to provide an image processing device, an image processing method, and a program capable of solving the problems described above.

Means for Solving the Problem

According to a first aspect of the present invention, an image processing device is provided including: a first feature quantity selecting unit configured to select a first feature quantity of a document image that is a character recognition target among first feature quantities that have been recorded in advance on the basis of a result of a character recognition process for a plurality of document images and represent features of character strings of an item for each type of the document images and for each specific item; a character recognition processing unit configured to perform a character recognition process for the document image that is the character recognition target; a character string selecting unit configured to select a character string of a specific item corresponding to the first feature quantity among the character strings acquired as a result of the character recognition process; and a determination result acquiring unit configured to acquire a determination result indicating whether or not a character string that has been input in advance matches the character string of the specific item in a case in which the character string selecting unit has not selected any one of the character strings acquired as a result of the character recognition process as the character string of the specific item.

According to a second aspect of the present invention, an image processing method is provided including: selecting a first feature quantity of a document image that is a character recognition target among first feature quantities that are recoded in advance on the basis of a result of a character recognition process for a plurality of document images and represent features of character strings of an item for each type of the document images and for each specific item; performing a character recognition process for the document image that is the character recognition target; selecting a character string of a specific item corresponding to the first feature quantity among the character strings acquired as a result of the character recognition process; and acquiring a determination result indicating whether or not a character string that has been input in advance matches the character string of the specific item in a case in which any one of the character strings acquired as a result of the character recognition process has not been selected as the character string of the specific item.

According to a third aspect of the present invention, a program stored on a storage medium causing a computer to execute processes is provided including: selecting a first feature quantity of a document image that is a character recognition target among first feature quantities that are recoded in advance on the basis of a result of a character recognition process for a plurality of document images and represent features of character strings of an item for each type of the document images and for each specific item; performing a character recognition process for the document image that is the character recognition target; selecting a character string of a specific item corresponding to the first feature quantity among the character strings acquired as a result of the character recognition process; and acquiring a determination result indicating whether or not a character string that has been input in advance matches the character string of the specific item in a case in which any one of the character strings acquired as a result of the character recognition process has not been selected as the character string of the specific item.

Advantageous Effects of Invention

According to the present invention, not only in a case in which data acquired in advance and data acquired through an OCR process match each other, but also in other cases, the burden on an operator checking results of the OCR process can be reduced.

BRIEF DESCRIPTION OF DRAWINGS

FIG. 5 is a diagram illustrating an overview of a recording table stored in a database according to the first embodiment.

DESCRIPTION OF EMBODIMENTS

Hereinafter, although embodiments of the present invention will be described, the following embodiments do not limit the invention according to the claims. In addition, all the combinations of features described in the embodiments are not essential to solving means of the invention.

Figure 1:
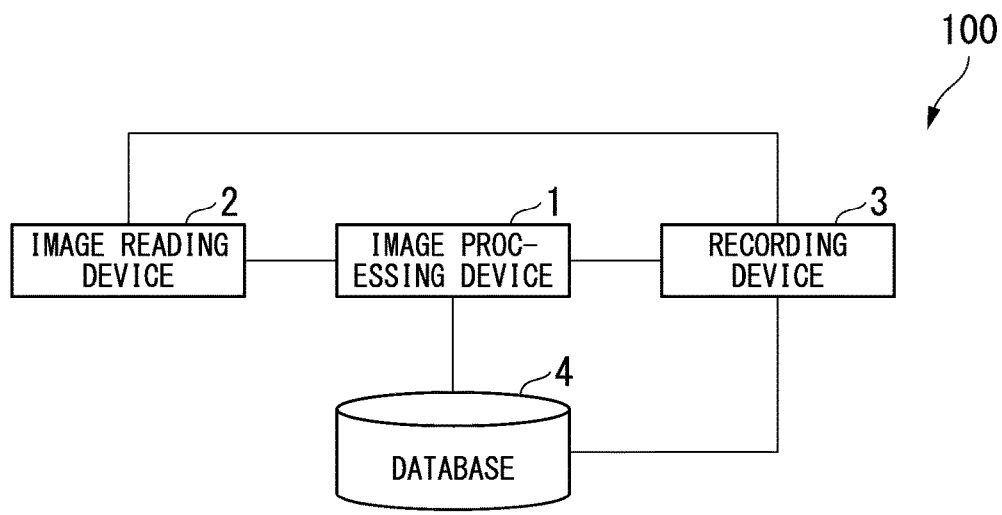
FIG. 1 is a diagram illustrating an example of the device configuration of an image processing system including an image processing device according to an embodiment.

FIG. 1 is a diagram illustrating an example of the device configuration of an image processing system including an image processing device according to an embodiment.

In the configuration illustrated in FIG. 1, the image processing system 100 includes an image processing device 1, an image reading device 2, a recording device 3, and a database 4.

The image processing device 1 is connected to the image reading device 2 using a communication cable. The image reading device 2 optically acquires image data such as a document slip or the like and outputs the acquired image data to the image processing device 1. The image processing device 1 performs an optical character recognition (OCR) process for the image data of the document slip, thereby achieving character recognition. The image processing device 1 outputs a result of the character recognition to the recording device 3, and the recording device 3 records the result of the character recognition in the database.

A target document for the image processing device 1 is not limited to a specific type. Various documents on which an OCR process can be performed can be set as a processing target of the image processing device 1.

The database 4 is connected to the image processing device 1 and the recording device 3. The database 4 stores a correspondence relation between image data of a plurality of document slips registered in the past that is acquired from the recording device 3 and a recording character string representing a character string that is a recording target among character strings included in the image data. A character string represented by the recording character string is an important character string to be recorded and stored in the database 4 among character strings written in document slips. An operator using the image processing system 100 registers image data of a plurality of document slips registered in the past and recording character strings among character strings included in the image data in the database 4 in advance using the recording device 3.

The operator may be referred to as a user of the image processing device 1 or simply referred to as a user.

Sufficient correspondence relations between image data of document slips and information of recording character strings representing character strings that are recording targets among information of character strings included in the image data are assumed to have been recorded for many document slips in the database 4. The image processing device 1 performs processing in such a state.

Figure 2:
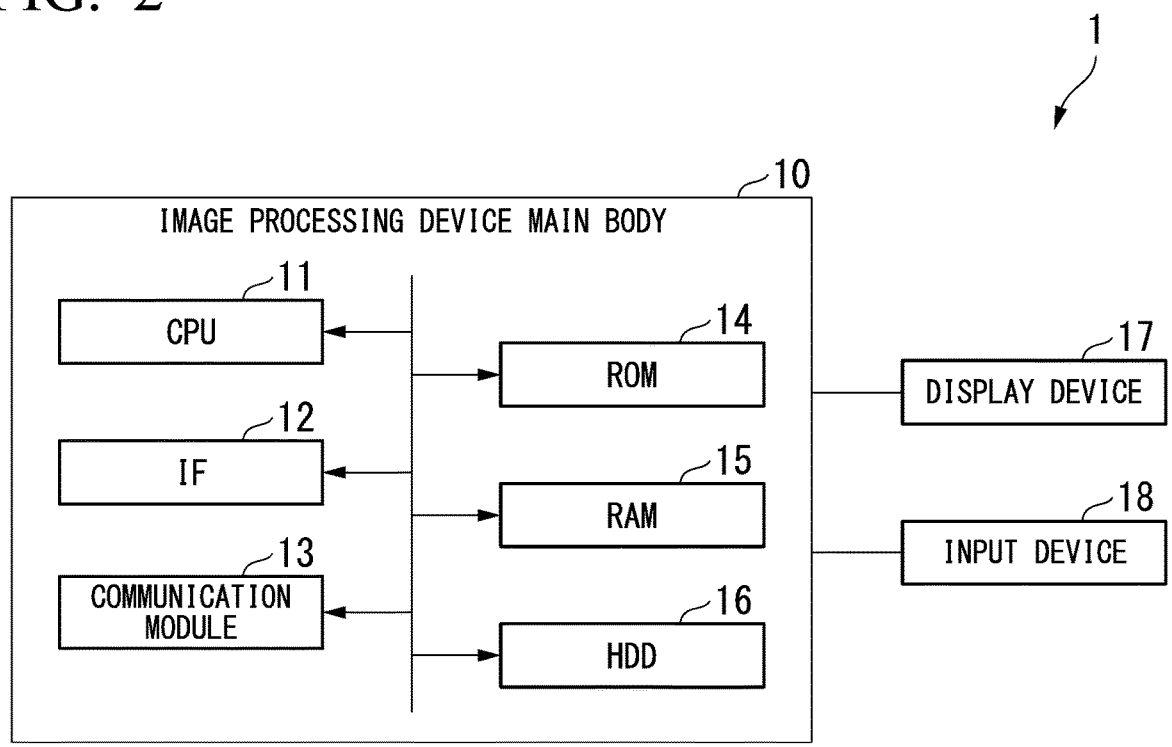
FIG. 2 is a diagram illustrating an example of the hardware configuration of an image processing device according to an embodiment.

FIG. 2 is a diagram illustrating an example of the hardware configuration of the image processing device.

In the configuration illustrated in FIG. 2, the image processing device 1 includes an image processing device main body 10, a display device 17, and an input device 18.

The image processing device main body 10 is a computer including components such as a central processing unit (CPU) 11, an interface (IF) 12, a communication module 13, a read only memory (ROM) 14, a random access memory (RAM) 15, a hard disk drive (HDD) 16, and the like. The communication module 13 may perform wired communication or wireless communication with the image reading device 2, the recording device 3, and the database 4 or may have both of these functions.

The display device 17, for example, includes a display screen such as a liquid crystal panel, a light emitting diode (LED) panel, or the like.

The input device 18, for example, is a device operated by a user such as a keyboard, a mouse, or a touch sensor that is disposed in a display screen of the display device 17 and configures a touch panel or a combination thereof or the like.

First Embodiment

Figure 3:
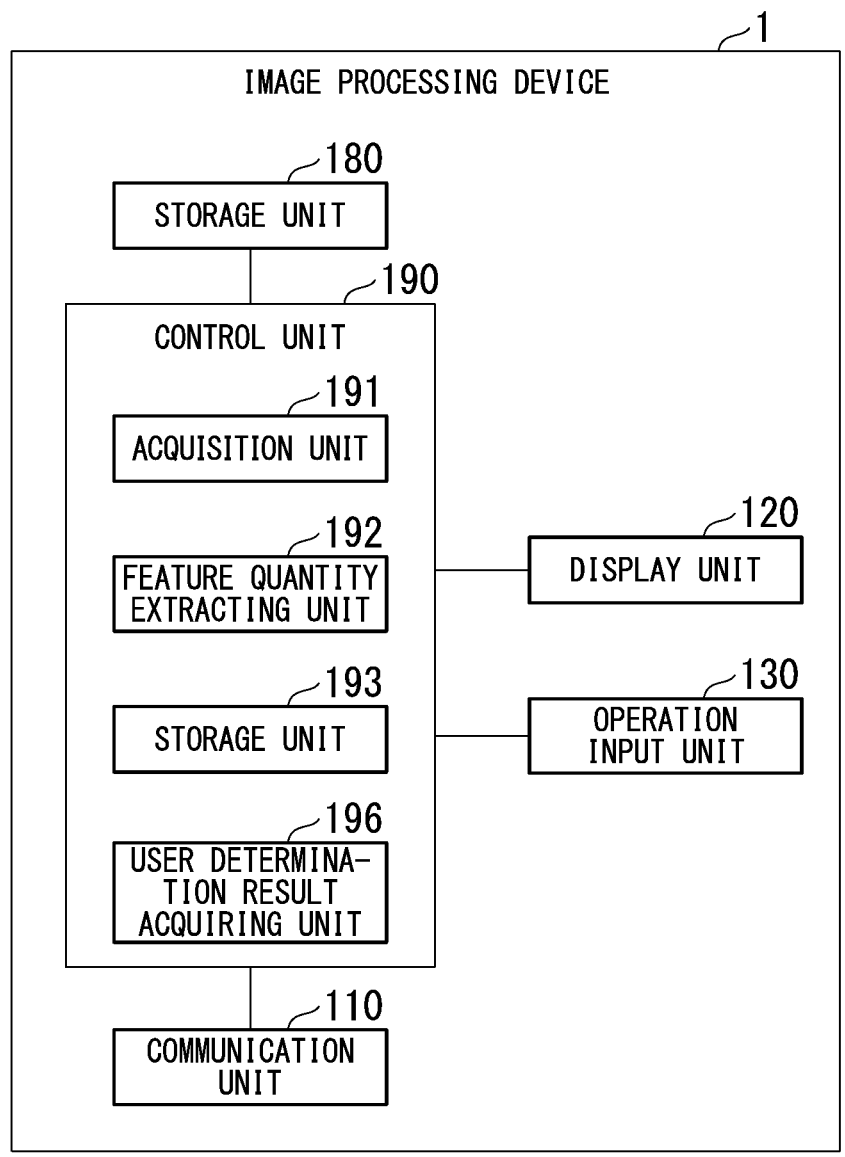
FIG. 3 is a schematic block diagram illustrating the functional configuration of an image processing device according to a first embodiment.

FIG. 3 is a schematic block diagram illustrating the functional configuration of an image processing device 1 according to the first embodiment.

A communication unit 110 is configured using the communication module illustrated in FIG. 2 and communicates with other devices. Particularly, the communication unit 110 communicates with the image reading device 2, the recording device 3, and the database 4.

A display unit 120 is configured using the display device 17 illustrated in FIG. 2 and displays various images.

An operation input unit 130 is configured using the input device illustrated in FIG. 2 and accepts a user's operation.

A storage unit 180 is configured using the ROM 14, the RAM 15, and the HDD 16 illustrated in FIG. 2 and stores various types of data.

A control unit 190 is configured by the CPU 11, which is illustrated in FIG. 2, reading a program from the storage unit 180 (the ROM 14, the RAM 15, and the HDD 16 illustrated in FIG. 2) and executing the program. The control unit 190 executes various processes by controlling each unit of the image processing device 1.

An acquisition unit 191 acquires image data of a document slip.

A recording unit 193 extracts a recording character string from information of character strings read from image data of a new document slip using feature quantities of character strings in the image data of the new document slip and records the extracted recording character string. As described above, the recording character string is a character string of a recording target. In other words, the recording character string is a character string of a specific item to be acquired from a result of the OCR process and output by the image processing device 1.

The recording unit 193 indicates an example of a first feature quantity selecting unit and selects a first feature quantity of a document image that is a target for character recognition among first feature quantities for each type of document image and for each specific item. The first feature quantity represents a feature of a recording character string and, here, coordinate information representing the position of the character string in a document image is included in the first feature quantity. Thus, the recording unit 193 selects a first feature quantity that represents the position of a character string of a specific item in the document image.

In addition, the recording unit 193 indicates an example of a character string selecting unit and selects a character string of a specific item corresponding to a first feature quantity among character strings acquired as a result of the character recognition process. However, the recording unit 193 does not always succeed in selection of a character string of a specific item. For example, there are cases in which the recording unit 193 may not be able to select a character string of a specific item depending on a result of the OCR process. In addition, there are also cases in which a value of the character string selected by the recording unit 193 is different from the original value of the character string of the specific item in accordance with a result of the OCR process.

In a case in which the character string of the specific item cannot be appropriately acquired from the result of the OCR process, the image processing device 1 receives an input or a correction of a character string of the specific item by an operator.

In addition, there are cases in which the image processing device 1 can use a character string input in advance as a character string of a specific item (in-advance input data). As an example of a case in which in-advance input data can be acquired, there is a case in which an operation flow or the like is manually input such as a case in which part of details of a payment slip is input by a staff member of a sales department as an input of transaction details, for example, when a staff member of an accounting department performs an OCR process of the payment slip.

A feature quantity extracting unit 192 extracts a first feature quantity representing a feature of a recording character string included in image data of a document slip for each piece of image data of document slips on the basis of a result of the process of recognizing image data of a plurality of the document slips. In addition, the feature quantity extracting unit indicates an example of a character recognition processing unit and performs a character recognition process (OCR process) of a document image that is a character recognition target. The extraction of a feature quantity will be also referred to as generation of a feature quantity.

In addition, the feature quantity extracting unit 192 indicates an example of a machine learning unit and, in a case in which it is determined that a character string input in advance and a character string of a specific item match each other, performs a process using the character string input in advance.

More specifically, the feature quantity extracting unit 192 updates the first feature quantity using the character string input in advance. Thus, the feature quantity extracting unit 192 uses the character string input in advance for machine learning acquiring information used for selecting a character string of a specific item among character strings acquired as a result of character recognition. Here, the feature quantity extracting unit 192 may be configured to update the first feature quantity only in a case in which the recording unit 193 fails to select a character string of a specific item among character strings acquired as a result of character recognition or may be configured to update the first feature quantity also in a case in which selection is successful. Thus, the feature quantity extracting unit 192 may be configured to perform machine learning in any one of a case in which the recording unit 193 has selected a character string of a specific item among character strings acquired as a result of character recognition and a case in which the recording unit 193 has not selected a character string of a specific item.

In a case in which the recording unit 193 has not selected any one of character strings acquired as a result of the character recognition as the character string of the specific item, a user determination result acquiring unit 196 acquires a user determination result indicating whether or not the character string input in advance and the character string of the specific item match each other. More specifically, the user determination result acquiring unit 196 presents a document image representing the position of the character string of the specific item and the character string input in advance to a user and acquires a user determination result indicating whether or not the character string of the specific item appearing in the document image and the character string input in advance match each other.

In accordance with such a process, the image processing device 1 allows the amount of effort needed for recording character string information, included in the image data of a new document slip, to be reduced.

Figure 4:
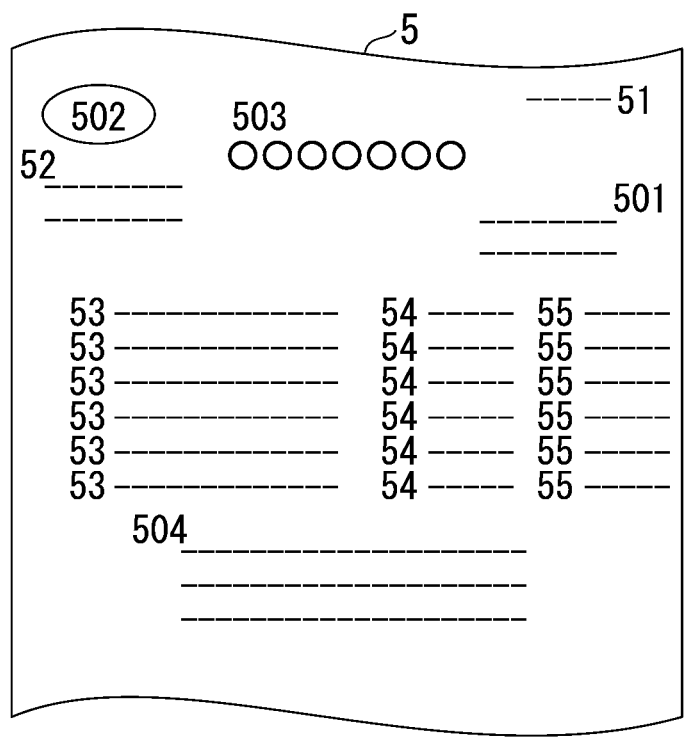
FIG. 4 is a diagram illustrating an example of a document slip.

FIG. 4 is a diagram illustrating an example of a document slip.

As illustrated in this drawing, in a document slip, for example, a mark of a company that has generated the document, a generation date, a generating staff member, document details, and the like are written in a format that is unique to the document slip. As document details, for example, when the document slip is an order slip, one or a plurality of sets of an ordered product name and information such as the number of ordered products thereof, and the like may be present. On the basis of one document slip, an operator records a character string of a specific item to be recorded (recording character string) among character strings written in the document slip in the database 4 using the recording device 3. More specifically, an operator inputs a recording character string to be recorded in the database 4 by the recording device 3 while viewing a document slip. In addition, the operator causes the image reading device 2 to read image data of the document slip. The document slip is read by the image reading device 2 on the basis of an operator's operation and is output to the image processing device 1. Then, on the basis of an operator's operation and the control of the image processing device 1, the recording device 3 records image data for one document slip and a recording character string among character strings written in the document slip in the database 4 in association with each other.

In the example illustrated in FIG. 4, for example, items are a date 51, an ordering destination 52, a product name 53, a quantity 54, and the amount of money 55. In addition, in the example illustrated in FIG. 4, a character string of the date 51, the ordering destination 52, the product name 53, the quantity 54, and the amount of money 55 is a recording character string. Other information such as non-recording character strings that are not recorded by the operator and the like are printed on the document slip 5. For example, the information may be a name 501 of an ordering person who has issued the document slip, an emblem image 502 of the ordering person, a title 503 of the document slip, a greeting phrase 504, and the like.

FIG. 5 is a diagram illustrating an overview of a recording table stored in a database.

As illustrated in FIG. 5, in the database 4, image data for a document slip and a recording character string among character strings written in the document slip are stored in the recording table in association with each other.

Figure 6:
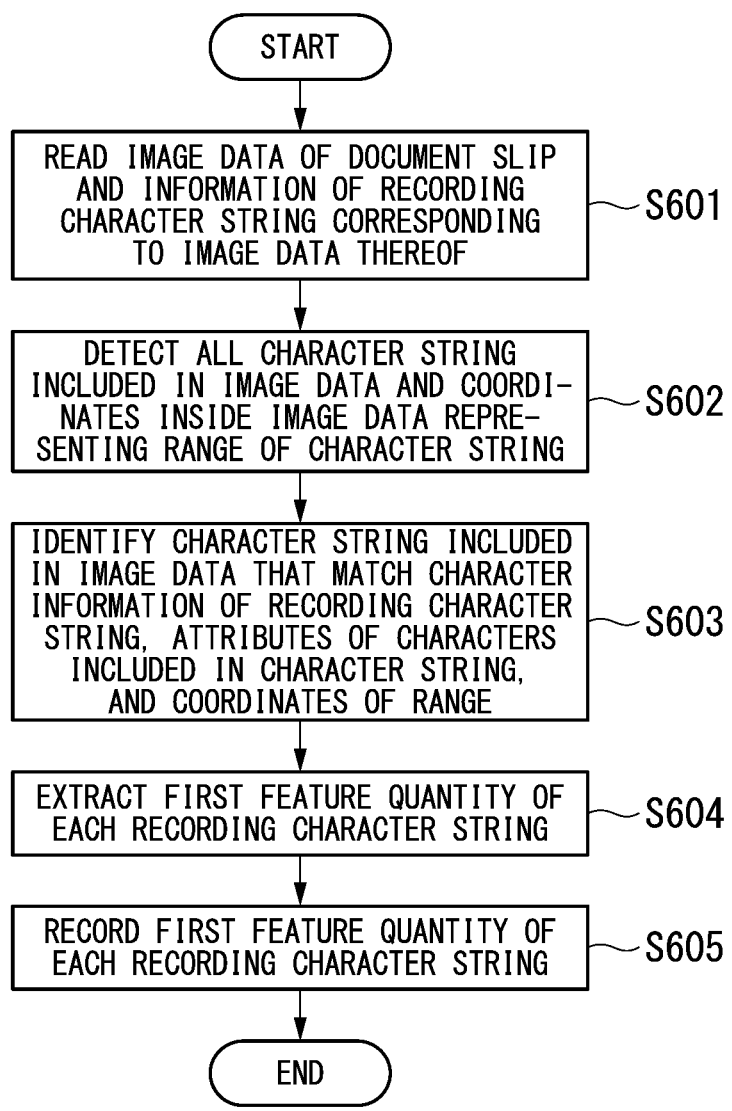
FIG. 6 is a first diagram illustrating the processing flow of an image processing device according to the first embodiment.

FIG. 6 is a first diagram illustrating the processing flow of the image processing device according to the first embodiment. FIG. 6 illustrates an example of a processing procedure of the image processing device 1 for extracting a first feature quantity.

Next, the processing flow of the image processing device 1 will be described in order.

First, in the database 4, combinations of image data for a certain document slip and a recording character string written in the document slip corresponding to a plurality of document slips having the same format are recorded. For example, a plurality of pieces of recording character string information (information representing a recording character string) having a format of the document slip 5 illustrated in FIG. 4 are recorded.

As such combinations of image data and a recording character string, for example, image data and recording character string information of document slips handled in past operations may be used. In a case in which image data and recording character string information of a required amount can be secured from past operations, image data and recording character string information do not need to be additionally prepared to allow the image processing device to acquire a first feature quantity.

In such a state, an operator starts the operation of the image processing device 1 and instructs the image processing device 1 to start the process.

The acquisition unit 191 of the image processing device 1 reads image data of a document slip and information of a recording character string corresponding to the image data from the database 4 by controlling the communication unit 110 (Step S601). The acquisition unit 191 outputs the image data and the recording character string to the feature quantity extracting unit 192.

The feature quantity extracting unit 192 performs an OCR process for the image data and detects all the character strings included in the image data and sets of coordinates in the image data that represent ranges of the character strings (Step S602). A character string is a unit of characters composed of a plurality of characters. The feature quantity extracting unit 192 analyzes a range of one unit in accordance with a spacing away from other characters and the like, extracts one or a plurality of characters included in the range as a character string, and detects coordinates representing the range of the character string included in the image data. Characters included as a character string may include symbols such as an ideogram and a photogram, a mark, an icon image, and the like.

The feature quantity extracting unit 192 compares a character string extracted from image data through an OCR process with a recording character string read from the database 4 together with the image data. The feature quantity extracting unit 192 identifies a character string included in image data matching character information of a recording character string among character strings extracted from the image data through the OCR process, attributes of characters included in the character string, and coordinates of the range thereof (Step S603).

The attributes of a character (character attributes) described here are information represented using a number, a letter, a Japanese character, a Chinese character, the number of characters, a height of a character, a font, and the like. The coordinates of the range of a character string are coordinates representing positions of the character string in a document slip. For example, the coordinates of the range of a character string may be information that represents coordinates of a first character included in the character string, coordinates of a last character, and the like. Hereinafter, attributes of characters included in a character string and coordinates of the range of the character string will be collectively referred to as attributes of the character string or character string attributes.

Character information described here may be only a character string or may include character string attributes. In other words, the feature quantity extracting unit 192 may be configured to determine whether or not a recording character string and a character string included in the image data are the same as a character string. Alternatively, the feature quantity extracting unit 192 may be configured to determine an identity of character string attributes in addition to the identity of characters.

In addition, in a case in which the feature quantity extracting unit 192 cannot uniquely identify a character string of which character information matches that of the recording character string, the image processing device 1 may exclude the document image from processing targets (targets for extracting first feature quantities). Alternatively, the image processing device 1 may display images representing ranges of candidates for a recording character string using frames on the display unit 120 and identify a character string selected by an operator as the recording character string. The candidates for a recording character string described here are character strings associated with recording character strings determined not to be uniquely identified among character strings of which character information matches the character information of the recording character string. The identifying of a recording character string described here is determination of any one of character strings in a document slip as one recording character string.

In a case in which the feature quantity extracting unit 192 determines that character information of each of a plurality of character strings in a document slip matches the character information of one recording character string, the plurality of character strings become candidates for the recording information. When an operator selects any one of the plurality of character strings, a recording character string is uniquely identified.

Next, the feature quantity extracting unit 192 extracts a feature quantity that is common to document slips of the same format and is a feature quantity for each recording character string using character string attributes extracted for each document slip and for each recording character string (Step S604). A feature quantity of a recording character string, for example, is a value that quantitively represents a predetermined feature of the recording character string in the document slip. The predetermined feature may be a plurality of features. The predetermined feature may be different in accordance with a recording character string or may be the same among a plurality of recording character strings.

More specifically, the feature quantity extracting unit 192, for each recording character string, analyzes character string attributes of the recording character string in a plurality of document slips and extracts one feature quantity for one recording character string.

A method used by the feature quantity extracting unit 192 for extracting a feature quantity that is common to document slips of the same format and is a feature quantity for each recording character string is not limited to a specific method. For example, the feature quantity extracting unit 192 may be configured to acquire a maximum frequency (Mode) of each of items such as coordinates of a first character, coordinates of a last character, a type of character, a height of a character, a type of font, and the like for a plurality of character string attributes acquired from a plurality of document slips. In addition, the feature quantity extracting unit 192 may be configured to acquire an average or a median of each item for attributes represented using numerical values such as the coordinates of a first character, the coordinates of a last character, the height of a character, a distance between characters, and the like. Furthermore, the feature quantity extracting unit 192 may be configured to use a feature quantity having a range or a feature quantity represented by a plurality of numerical values such as a maximum value or a minimum value of an item represented using a numerical value as a feature quantity. In addition, the feature quantity extracting unit 192 may acquire the feature quantity by quantifying attributes other than those with numerical values such as a type of character or a type of font. Furthermore, the feature quantity extracting unit 192 may extract a feature quantity using a known machine learning algorithm.

In a case in which a plurality of numerical values are acquired for one format and one recording character string of a document slip, the feature quantity extracting unit 192 may be configured to vectorize the plurality of numerical values and extract a feature quantity of one vector.

A feature quantity, which is common to document slips of the same format and is a feature quantity for each recording character string, extracted by the feature quantity extracting unit 192 will be referred to as a first feature quantity. The feature quantity extracting unit 192 extracts a first feature quantity of each recording character string of a format using a plurality of document slips of the same format. The first feature quantity is a feature quantity used for extracting a recording character string. In the first feature quantity, one of information representing attributes of a character and coordinates representing a range of a character string or a combination thereof may be included.

The feature quantity extracting unit 192 records a first feature quantity acquired for each recording character string in the database 4 in association with an identifier of the format of the document slip (Step S605).

For example, the feature quantity extracting unit 192 records each first feature quantity representing character attributes, coordinates representing the range of a character string, and the like of each of the date 51, the ordering destination 52, the product name 53, the quantity 54, and the amount of money 55 that are recording character strings included in the format of the document slip 5 illustrated in FIG. 4 in the database 4 in association with a format identifier of the document slip 5.

After Step S605, the image processing device 1 ends the process illustrated in FIG. 6.

In accordance with the processes described above, the image processing device 1 can extract information (the first feature quantity) used for reducing the effort of an operator for recording recording character strings and store the information in the database 4. In this way, the image processing device 1 can receive an input of image data of a new document slip and record recording character strings included in the document slip in the database 4 automatically or semi-automatically. The processes will be described with reference to FIGS. 7 and 8.

Figure 7:
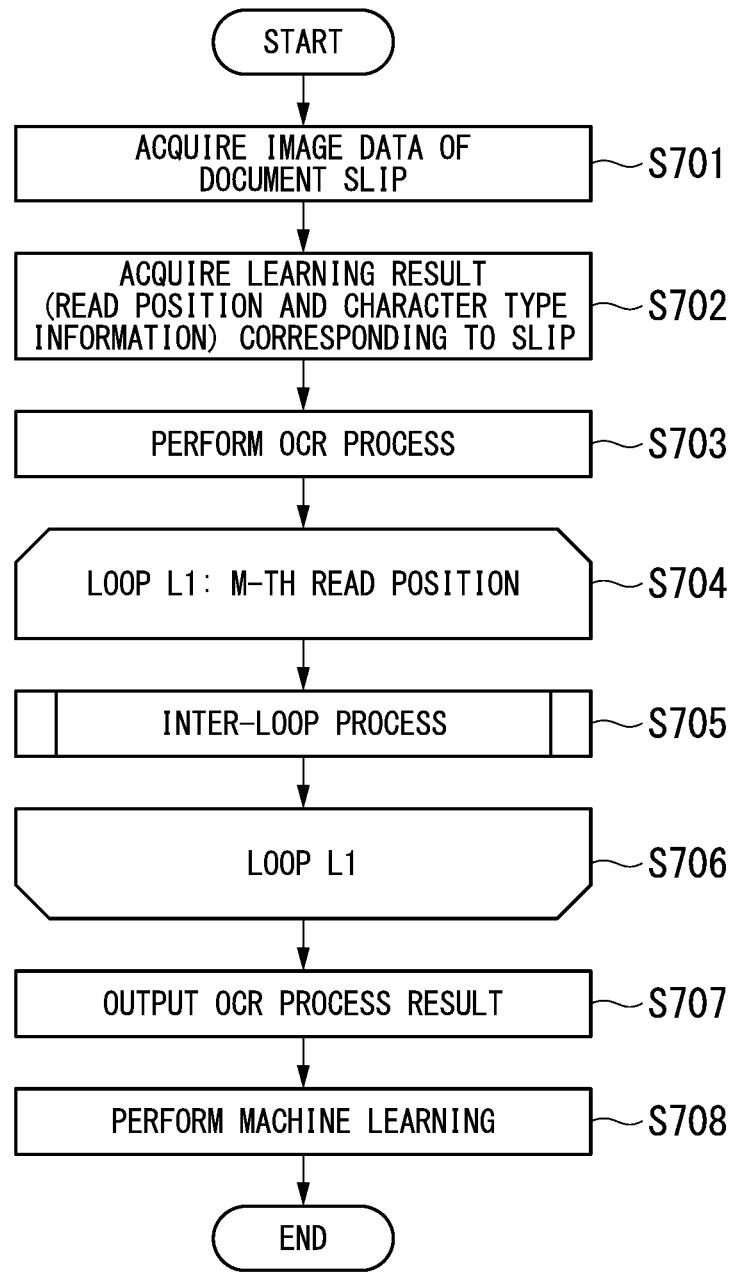
FIG. 7 is a diagram illustrating an example of an image in which a range of each candidate for a recording character string is represented using a frame in the first embodiment.

FIG. 7 is a second diagram illustrating the processing flow of the image processing device according to the first embodiment. FIG. 7 illustrates an example of the processing sequence in which the image processing device 1 extracts a recording character string from image data that has been newly input.

An operator performs an operation of causing the image reading device 2 to read a new document slip. In accordance with this, the image reading device 2 generates image data of the document slip and outputs (transmits) the generated image data to the image processing device 1. The acquisition unit 191 of the image processing device 1 acquires the image data from reception data of the communication unit 110 (Step S701). The acquisition unit 191 outputs the image data to the feature quantity extracting unit 192. The feature quantity extracting unit 192 acquires a learning result corresponding to slips from the database 4 (Step S702). For example, the feature quantity extracting unit 192, for each recording character string, acquires a first feature quantity representing a read position (coordinate information) and character type information of the recording character string as a result of learning.

In addition, the feature quantity extracting unit 192 performs an OCR process for the image data acquired from the image reading device 2 and detects a character string, a feature of characters included in the character string (character attributes), and coordinates of the range of the character string in the image data for each character string (Step S703). By comparing position information represented by a learning result with position information acquired through the OCR process, the feature quantity extracting unit 192 determines whether or not each character string acquired through the OCR process is a character string that is an acquisition target (a recording character string).

Next, the image processing device 1 starts a loop L1 in which the process is performed for each read position represented by a learning result (Step S704). A read position that is a processing target in the loop L1 will be referred to as an M-th read position. In the loop L1, the image processing device 1 performs an in-loop process (Step S705).

A recording character string will be also referred to as a character string of a read position or a read character string.

Figure 8:
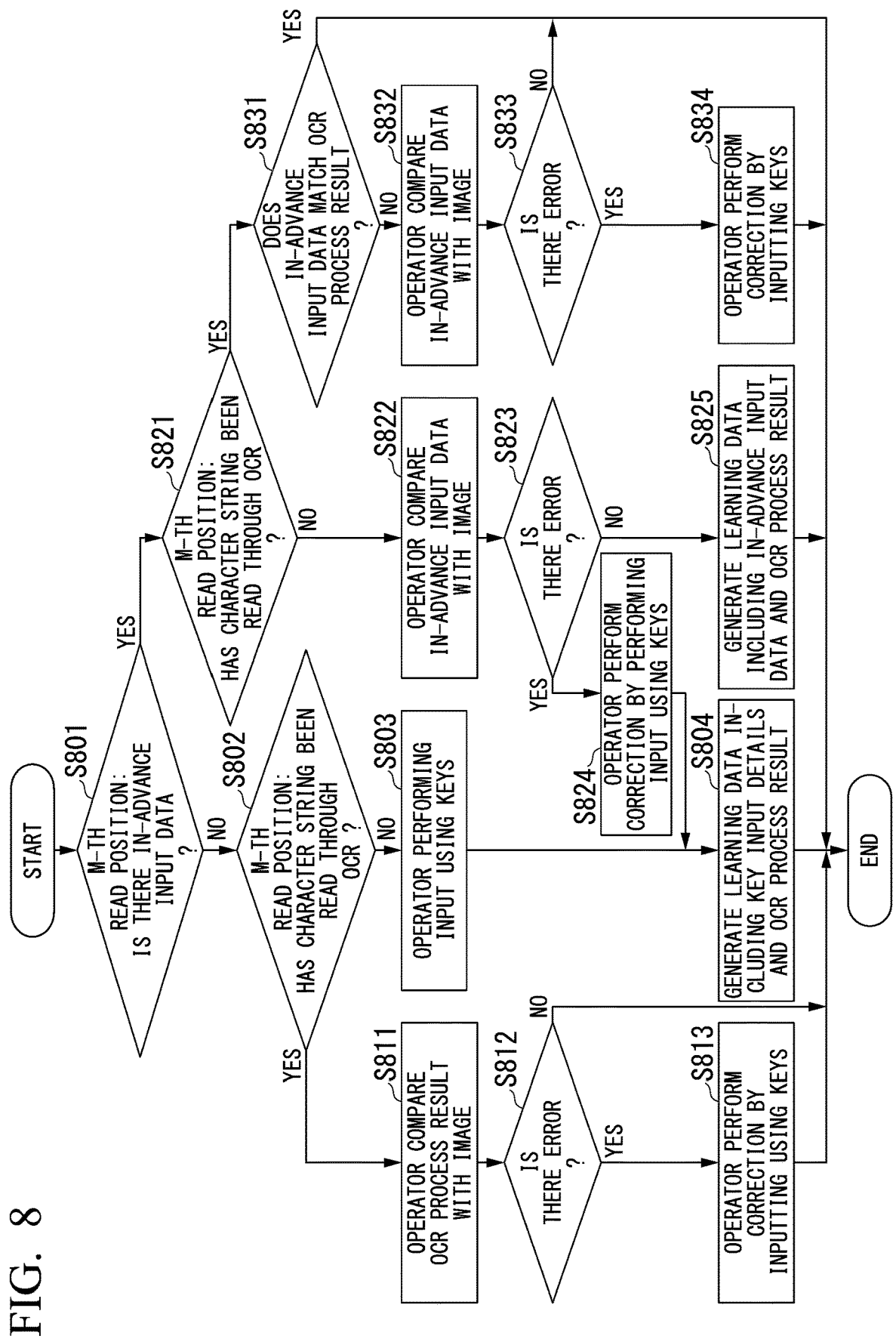
FIG. 8 is a second diagram illustrating the processing flow of an image processing device according to the first embodiment.

FIG. 8 is a third diagram illustrating the processing flow of the image processing device according to the first embodiment. FIG. 8 illustrates the sequence of the process performed in Step S705 by the image processing device 1.

In the process of FIG. 8, the recording unit 193 determines whether or not there is in-advance input data of a character string located at an M-th read position (Step S801). In a case in which it is determined that there is no in-advance input data (Step S801: No), the recording unit 193 determines whether or not a character string located at the M-th read position could be read through an OCR process (Step S802). In a case in which the recording unit 193 determines that the character string could not be read (Step S802: No), the image processing device 1 receives a key input from an operator for the M-th read position character string (Step S803). For example, the display unit 120 displays an input request screen on which a read position is represented by a rectangle on an image of a document slip, and the operation input unit 130 receives an input operation on a character string.

Then, the recording unit 193 generates learning data including key input details (a character string acquired through a key input) and an OCR processing result (Step S804). The learning data described here is learning data that is used for allowing the feature quantity extracting unit 192 to perform machine learning for updating the first feature quantity.

After Step S804, the image processing device 1 ends the process illustrated in FIG. 8 and causes the process to return to the process illustrated in FIG. 7.

On the other hand, in a case in which the recording unit 193 determines that a character string located at the M-th read position could be read through the OCR process in Step S802 (Step S802: Yes), the character string acquired by the operator through the OCR process is compared with the image of the document slip (Step S811). The image processing device 1 receives an operator's determination of whether or not there is an error in the character string acquired through the OCR process (Step S812). More specifically, the display unit 120 displays the character string acquired through the OCR process and the image of the document slip in accordance with the control of the user determination result acquiring unit 196. The display unit 120 displays the input request screen representing a read position using a rectangle on the image of the document slip. Then, the operation input unit 130 accepts an input operation of an operator's determination result. The user determination result acquiring unit 196 detects a user's determination result on the basis of an output signal of the operation input unit 130.

In a case in which it is determined that the character string acquired through the OCR process is correct (Step S812: No), the image processing device 1 ends the process illustrated in FIG. 8 and causes the process to return to the process illustrated in FIG. 7.

On the other hand, in a case in which it is determined that there is an error in the character string acquired through the OCR process (Step S812: Yes), the operator corrects the character string by inputting keys (Step S813). For example, the display unit 120 displays the character string that has been read through the OCR process and the image of the document slip. Then, the operation input unit 130 accepts a user's operation of correcting the character string.

After Step S813, the image processing device 1 ends the process illustrated in FIG. 8 and causes the process to return to the process illustrated in FIG. 7.

On the other hand, in a case in which it is determined that there is in-advance input data of the character string located at the M-th read position in Step S801 (Step S801: Yes), the recording unit 193 determines whether or not the character string located at the M-th read position could be read through the OCR process (Step S821). In a case in which the recording unit 193 determines that the character string could not be read (Step S821: No), the operator compares the character string of the in-advance input data with the image of the document slip (Step S822). The image processing device 1 receives operator's determination of whether or not there is an error in the character string of the in-advance input data (Step S823). More specifically, the display unit 120 displays the character string of the in-advance input data and the image of the document slip in accordance with the control of the user determination result acquiring unit 196. Then, the operation input unit 130 accepts an input operation of the operator's determination result. The user determination result acquiring unit 196 detects the user's determination result on the basis of an output signal of the operation input unit 130.

In a case in which it is determined that there is an error in the character string of the in-advance input data (Step S823: Yes), the operator corrects the character string by inputting keys (Step S824). For example, the display unit 120 displays the character string of the in-advance input data and the image of the document slip. Then, the operation input unit 130 accepts a user's operation of correcting the character string.

After Step S824, the process proceeds to Step S804.

On the other hand, in a case in which it is determined that the character string of the in-advance input data is correct in Step S823 (Step S823: No), the recording unit 193 generates learning data including the in-advance input data and the OCR process result (Step S825).

After Step S825, the image processing device 1 ends the process illustrated in FIG. 8 and causes the process to return to the process illustrated in FIG. 7.

On the other hand, in a case in which it is determined that the character string located at the M-th read position could be read through the OCR process in Step S821 (Step S821: Yes), the recording unit 193 determines whether or not the character string of the in-advance input data and the character string of the OCR process result match each other (Step S831). In a case in which the recording unit 193 determines matching (Step S831: Yes), the image processing device 1 ends the process illustrated in FIG. 8 and causes the process to returned to the process illustrated in FIG. 7.

On the other hand, in a case in which it is determined that the character string of the in-advance input data and the character string of the OCR process result do not match each other in Step S831 (Step S831: No), the operator compares the character string of the in-advance input data with the image of the document slip (Step S832). The image processing device 1 receives operator's determination of whether or not there is an error in the character string of the in-advance input data (Step S833). More specifically, the display unit 120 displays the character string of the in-advance input data and the image of the document slip in accordance with the control of the user determination result acquiring unit 196. Then, the operation input unit 130 accepts an input operation of an operator's determination result. The user determination result acquiring unit 196 detects a user's determination result on the basis of an output signal of the operation input unit 130.

In a case in which it is determined that the character string of the in-advance input data is correct (Step S833: No), the image processing device 1 ends the process illustrated in FIG. 8 and causes the process to return to the process illustrated in FIG. 7.

On the other hand, in a case in which it is determined that there is an error in the character string of the in-advance input data (Step S833: Yes), the operator corrects the character string by inputting keys (Step S834). For example, the display unit 120 displays the character string of the in-advance input data and the image of the document slip. Then, the operation input unit 130 accepts a user's operation of correcting the character string.

After Step S834, the image processing device 1 ends the process illustrated in FIG. 8 and causes the process to return to the process illustrated in FIG. 7.

After Step S705 illustrated in FIG. 7, the control unit 190 performs a process of terminating the loop L1 (Step S706). More specifically, the control unit 190 determines whether or not the process of the loop L1 has been completed for all the read positions represented by a learning result. In a case in which the control unit 190 determines that there is a read position that has not been processed, the process is caused to return to Step S704, and the image processing device 1 continuously performs the process of the loop L1 for the read position that has not been processed. On the other hand, in a case in which the control unit 190 determines that the process of the loop L1 has been completed for all the read positions, the image processing device 1 ends the process of the loop L1.

After the loop L1, the image processing device 1 outputs a recording character string as a result of the OCR process and records the recording character string in the database 4 (Step S707). More specifically, the recording unit 193 records the recording character string in the database 4 through the communication unit 110. In addition, the feature quantity extracting unit 192 updates the first feature quantity by performing machine learning using acquired learning data (Step S708). For example, the image processing device 1 may perform the processing flow illustrated in FIG. 6 again. Alternatively, by performing additional learning, the image processing device 1 may update the first feature quantity without performing the process for data that has not been processed in FIG. 6 again.

After Step S708, the image processing device 1 ends the process illustrated in FIG. 7.

Learning data generation timings illustrated in FIG. 8 (Steps S804 and S825) are examples and are not limited thereto. For example, in addition to Steps S804 and S825, the recording unit 193 may also generate learning data in the case of No in Step S812, after Step S813, in the case of No in Step S833, and after Step S834.

Particularly, either in a case in which the image processing device 1 fails in the OCR process (in a case in which a recording character string cannot be appropriately acquired in the OCR process) or in a case in which the image processing device 1 succeeds in the OCR process, it is possible to apply statistical information of the formats of document slips to machine learning by generating the learning data using the recording unit 193.

Here, in a case in which machine learning is performed only in a case in which the OCR process fails, since the machine learning is not performed in a case in which the image processing device 1 succeeds in the OCR process, there is a case in which statistical information of formats of document slips is not applied on the machine learning.

For example, a case in which there is a recording character string on the lower left side in 99 document slips out of 100 document slips, and there is a recording character string on the upper right side only in one document slip will be considered. In such a case, when the image processing device 1 succeeds in the OCR process for document slips in which there is a recording character string at the same position (Step S802: Yes or Step S821: Yes), the image processing device 1 performs learning once in each of a case in which there is a recording character string on the lower left side and a case in which there is a recording character string on the upper right side. Although the ratio is actually 99:1, learning is performed at the ratio of 1:1 in the learning performed by the image processing device 1, and there is a likelihood of excessive learning for a case in which there is a recording character string on the upper right side.

In contrast to this, by performing machine learning (update of a first feature quantity) in both a case in which the image processing device 1 succeeds in the OCR process and a case in which the image processing device 1 fails in the OCR process, statistical information of formats of document slips can be applied to the machine learning. For example, as described above, in addition to Steps S804 and S825, the recording unit 193 also generates learning data in the case of No in Step S812, after Step S813, in the case of No in Step S833, and after Step S834. In this way, in any of a case in which the image processing device 1 fails in the OCR process or a case in which the image processing device 1 succeeds in the OCR process, the feature quantity extracting unit 192 updates the first feature quantity.

The case in which the image processing device 1 succeeds in the OCR process described here is a case in which the image processing device 1 (particularly, the recording unit 193) records a character string read through the OCR process in the database 4 as a recording character string in Step S708 illustrated in FIG. 7. On the other hand, a case in which the image processing device 1 fails in the OCR process is a case in which the image processing device 1 (particularly, the recording unit 193) records a character string acquired through a process other than the OCR process in the database 4 as a recording character string in Step S708 illustrated in FIG. 7. As examples of a character string acquired through a process other than the OCR process, there are a character string of in-advance input data and a character string input by a user using keys.

When the image processing device 1 updates the first feature quantity in the processes illustrated in FIGS. 7 and 8, it is expected that the accuracy of the first feature quantity is improved by increasing the number of pieces of sample data, and the accuracy with which the image processing device 1 extracts a recording character string is improved. In addition, in a case in which a recording character string is added in the process illustrated in FIG. 8, the image processing device 1 can extract also the recording character string that has been newly added from image data, and operator's effort for inputting a character string is expected to be saved.

According to the processes illustrated in FIGS. 7 and 8, the image processing device 1 can automatically record a recording character string in image data of a document slip that has been newly input using image data and recording character strings of document slips that have been recorded by an operator in advance. Therefore, the image processing device 1 can reduce operator's effort for recording a recording character string of a document slip.

Second Embodiment

In a second embodiment, a case in which an image processing device 1 corresponds to a plurality of formats of document slips will be described.

Figure 9:
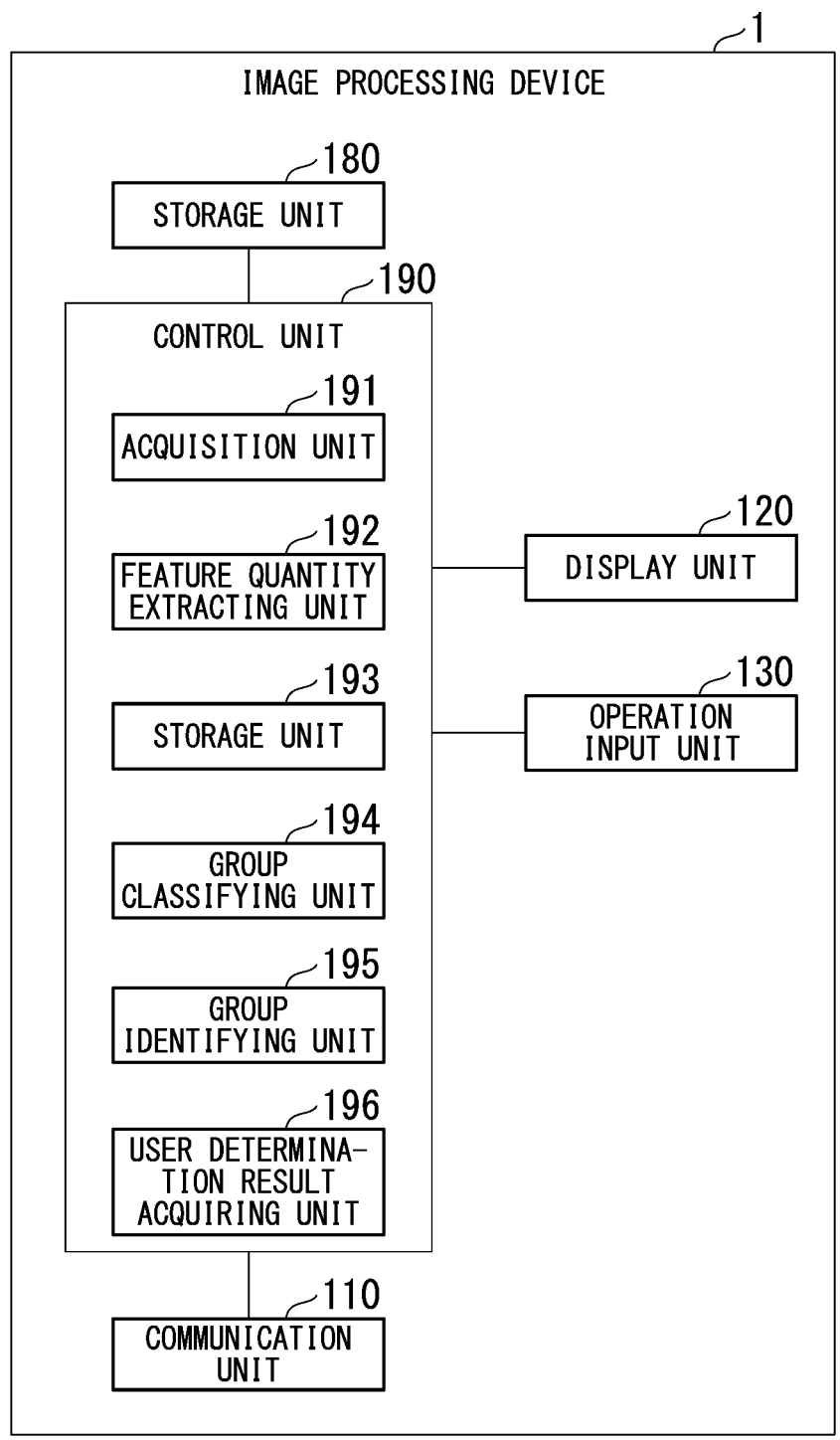
FIG. 9 is a schematic block diagram illustrating the functional configuration of an image processing device according to a second embodiment.

FIG. 9 is a schematic block diagram illustrating the functional configuration of an image processing device according to the second embodiment.

As illustrated in FIG. 9, the image processing device 1 according to the second embodiment further has functions of a group classifying unit 194 and a group identifying unit 195 in addition to the functional units illustrated in FIG. 3.

Figure 10:
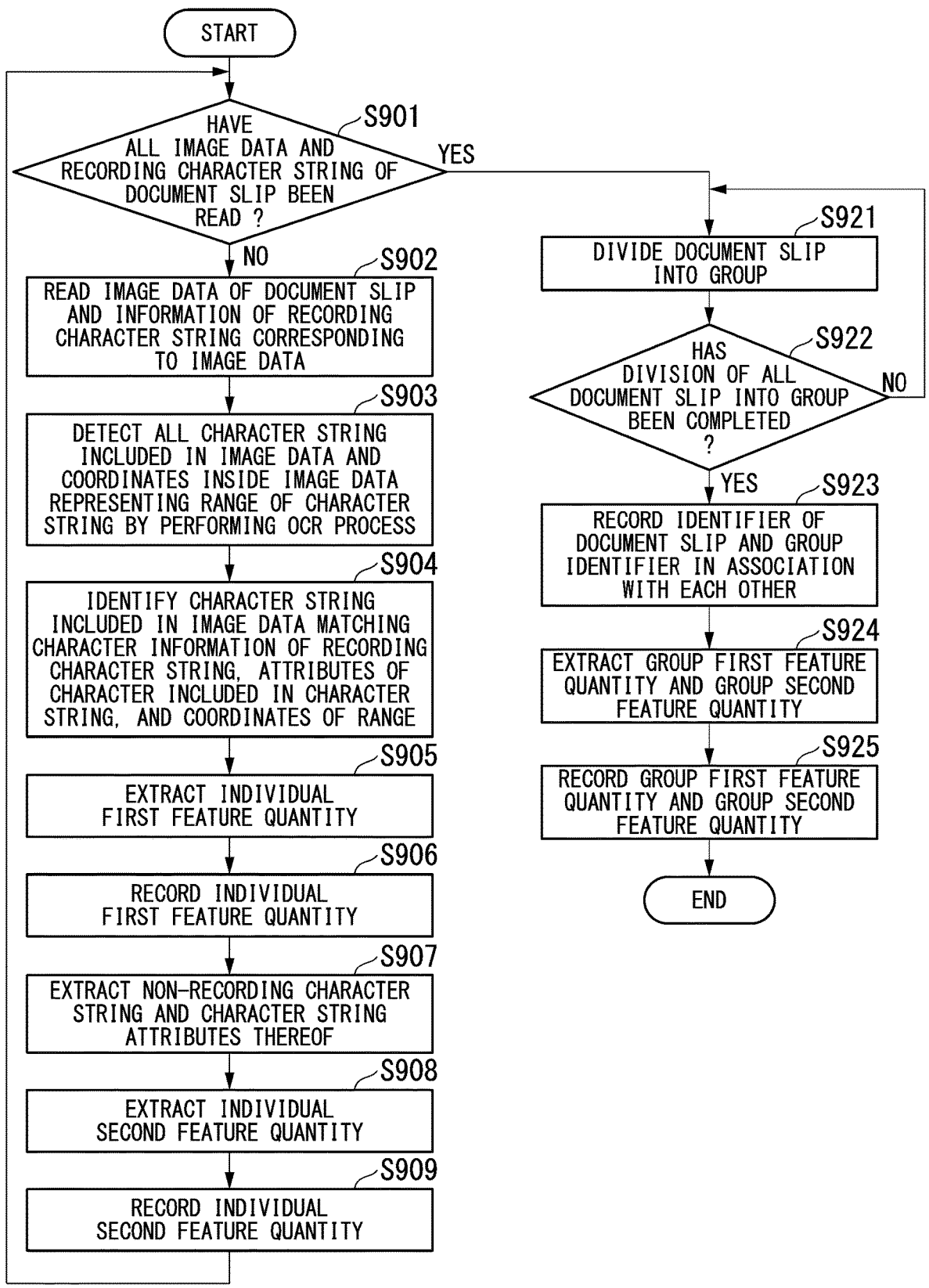
FIG. 10 is a first diagram illustrating the processing flow of an image processing device according to the second embodiment.

FIG. 10 is a first diagram illustrating the processing flow of the image processing device according to the second embodiment.

Next, the process flow of the image processing device 1 according to the second embodiment will be described in order.

In a database 4, many combinations of image data of a plurality of document slips having different formats and a recording character string written in each document slip are recorded for each document slip. In such a state, an operator starts the operation of the image processing device 1 and instructs the image processing device 1 to start the process.

An acquisition unit 191 of the image processing device 1 determines whether or not all the information of image data of document slips and recording character strings corresponding to the image data has been read from the database 4 (Step S901). In the case of "No", the acquisition unit 191 reads image data of a document slip and information of a recording character string corresponding to the image data from the database 4 (Step S902). The acquisition unit 191 outputs the image data and the recording character string to a feature quantity extracting unit 192.

The feature quantity extracting unit 192 performs an OCR process for the image data and detects all the character strings included in the image data and coordinates in the image data (Step S903). A character string is a unit of characters composed of a plurality of characters. The feature quantity extracting unit 192 analyzes a range of one unit thereof in accordance with a spacing away from other characters and the like, extracts one or a plurality of characters included in the range as a character string, and detects coordinates representing the range of the character string included in the image data. Characters included as a character string may include symbols such as an ideogram and a photogram, a mark, an icon image, and the like.

The feature quantity extracting unit 192 compares a character string extracted from image data through an OCR process with a recording character string read from the database 4 together with the image data. The feature quantity extracting unit 192 identifies a character string included in image data matching character information of a recording character string among character strings extracted from the image data through the OCR process, attributes of characters included in the character string, and coordinates of the range thereof (Step S904).

As described in the first embodiment, attributes of a character described here are information represented using a number, an alphabet, a Japanese character, a Chinese character, the number of characters, a height of a character, a font, and the like. The coordinates of the range of a character string are coordinates representing positions of the character string in a document slip. For example, the coordinates of the range of a character string may be information that represents coordinates of a first character included in the character string, coordinates of a last character, and the like. Attributes of characters included in a character string and coordinates of the range of the character string will be collectively referred to as attributes of the character string or character string attributes.

Similar to the case of the first embodiment, character information described here may be only a character string or may include character string attributes. In other words, the feature quantity extracting unit 192 may be configured to determine whether or not a recording character string and a character string included in the image data are the same as a character string. Alternatively, the feature quantity extracting unit 192 may be configured to determine an identity of character string attributes in addition to the identity of characters.

In addition, in a case in which the feature quantity extracting unit 192 cannot uniquely identify a character string of which character information matches that of the recording character string, the image processing device 1 may exclude the document image from processing targets (targets for extracting first feature quantities). Alternatively, the image processing device 1 may display images representing ranges of candidates for a recording character string using frames on the display unit 120 and identify a character string selected by an operator as the recording character string. As described in the first embodiment, the candidates for a recording character string described here are character strings associated with a recording character string determined not to be uniquely identified among character strings of which character information matches the character information of the recording character string. The identifying of a recording character string described here is determination of any one of character strings in a document slip as one recording character string.

In a case in which the feature quantity extracting unit 192 determines that character information of each of a plurality of character strings in a document slip matches the character information of one recording character string, the plurality of character strings become candidates for the recording information. When an operator selects any one of the plurality of character strings, a recording character string is uniquely identified.

Next, the feature quantity extracting unit 192 extracts a feature quantity for each document slip and for each recording character string using character string attributes extracted for each document slip and for each recording character string (Step S905). More specifically, the feature quantity extracting unit 192 quantifies a character string attribute of the character string associated with the recording character string in Step S904 as a feature quantity. In the second embodiment, since a plurality of types of formats are targeted, at a time point of Step S905 in which document slips have not been divided into groups for each format, different from the case of Step S604 illustrated in FIG. 7, a first feature quantity cannot be directly extracted. Then, as preparation of extraction of a first feature quantity for each group, the feature quantity extracting unit 192 extracts a feature quantity for each document slip and for each recording character string. The feature quantity for each document slip and for each recording character string will be referred to as an individual first feature quantity.

The feature quantity extracting unit 192 records an acquired individual first feature quantity in the database 4 in association with an identifier of the document slip and an identifier of the recording character string (Step S906). As the identifier of the recording character string, for example, coordinate values representing the position of the recording character string can be used.

For example, the feature quantity extracting unit 192 records each individual first feature quantity representing character attributes, coordinates representing the range of a character string, and the like of each of the date 51, the ordering destination 52, the product name 53, the quantity 54, and the amount of money 55 that are recording character strings included in the format of the document slip 5 illustrated in FIG. 4 in the database 4 for each document slip and for each recording character string in association with the identifier of the document slip 5 and the identifier of the recording character string.

In addition, the feature quantity extracting unit 192 extracts a non-recording character string in the image data that does not match character information included in the recording character string and character string attributes of the non-recording character string (Step S907).

As described above, the non-recording character string is a character string that is not recorded by an operator, in other words, a character string other than the recording character string. In the character string attributes, one or both of information representing attributes of characters included in the character string and information representing coordinates of the range of the character string may be included.

The feature quantity extracting unit 192 extracts a feature quantity for each document slip and for each non-recording character string using character string attributes extracted for each document slip and for each non-recording character string (Step S908).

More specifically, the feature quantity extracting unit 192 quantifies attributes of a character string (character string attributes) as a feature quantity for each character string not associated with any recording character string in Step S904. Similar to the case of the first feature quantity, at a time point of Step S908 in which document slips have not been divided into groups for each format, a feature quantity that is common to document slips of the same format cannot be generated (extracted).

Then, as preparation of extraction of a second feature quantity for each group, the feature quantity extracting unit 192 extracts a feature quantity for each document slip and for each non-recording character string. The feature quantity for each document slip and for each non-recording character string will be referred to as an individual second feature quantity.

The feature quantity extracting unit 192 may generate an individual second feature quantity acquired by gathering a plurality of non-recording character strings for each document slip. For example, the feature quantity extracting unit 192 may be configured to generate one individual second feature quantity for one document slip.

The feature quantity extracting unit 192 records the acquired individual second feature quantity in the database 4 in association with an identifier of the document slip and an identifier of the non-recording character string (Step S909). As the identifier of the non-recording character string, for example, coordinate values representing the position of the non-recording character string can be used.

For example, the feature quantity extracting unit 192 records individual second feature quantities representing a name 501 of an ordering person, an emblem image of the ordering person, a title 503 of the document slip, a greeting phrase 504, and the like that are non-recording character strings included in the format of the document slip 5 illustrated in FIG. 4 in the database 4 in association with the identifier of the document slip 5 and the identifier of the non-recording character string.

In the database 4, for each of a plurality of formats of document slips, image data of document slips of the format and information of a recording character string corresponding to the image data are recorded. The acquisition unit 191 of the image processing device 1 repeats the processes of Steps S901 to S909 until image data and information of recording character strings for all the document slips are read.

In Step S901, in a case in which the acquisition unit 191 determines that all the image data of document slips and the information of recording character strings corresponding to the image data have been read from the database 4 (Step S901: Yes), the group classifying unit 194 divides the document slips into groups (Step S921). The group classifying unit 194 divides document slips into groups on the basis of the individual second feature quantities included in the image data of the document slips. For example, the group classifying unit 194 divides document slips into groups on the basis of a degree of matching between non-recording character strings, a degree of matching between emblem images, a degree of matching between coordinate ranges of non-recording character strings, and the like represented by the individual second feature quantities. The group classifying unit 194 determines group identifiers of the document slips in this group division process. The group classifying unit 194 determines whether or not group division has been completed for all the document slips (Step S922).

In a case in which the group division has not been completed for all the document slips, the group classifying unit 194 repeats the process of Step S921. More specifically, in Step S922, in a case in which the group classifying unit 194 determines that there is a document slip for which the group division has not been completed (Step S922: No), the process returns to Step S921.

In a case in which the group division for all the document slips has been completed (Step S922: Yes), the group classifying unit 194 records an identifier of each document slip and a group identifier assigned to the document slip in a group table (recording table) of the database 4 in association with each other (Step S923).

The feature quantity extracting unit 192 reads an individual first feature quantity and an individual second feature quantity of each of one or a plurality of document slips belonging to a certain group from the database 4. The feature quantity extracting unit 192 extracts each group first feature quantity and each group second feature quantity corresponding to the individual first feature quantity and the individual second feature quantity of each document slip belonging to the group (Step S924). Each group first feature quantity may be a value such as an average of individual first feature quantities of document slips belonging to a group. Similarly, each group second feature quantity may be a value such as an average of individual second feature quantities of document slips belonging to a group. Each group first feature quantity and each group second feature quantity may not correspond to an average of the individual first feature quantities and an average of the individual second feature quantities, respectively, and each group first feature quantity and each group second feature quantity may be extracted using any technique as long as the feature quantities are calculated such that recording character strings and non-recording character strings of one or a plurality of document slips belonging to a group can be identified using a predetermined statistical process or a technique such as machine learning.

For example, the feature quantity extracting unit 192 may (directly) extract a character string attribute for each recording character string from a plurality of document slips belonging to the same group and generate group first feature quantities in Step S924. In such a case, the feature quantity extracting unit 192 skips the extraction and recording of the individual first feature quantities in Steps 5905 and 5906 (does not perform a particular process).

On the other hand, the individual second feature quantity may be extracted by the feature quantity extracting unit 192 in Step S908 such that it can be used for group division in Step S921. However, in Step 921, the group classifying unit 194 may perform group division of document slips using non-recording character strings without using the individual second feature quantities. In such a case, the feature quantity extracting unit 192 may extract group second feature quantities (directly) from character string attributes of non-recording character strings of a plurality of document slips belonging to the same group in Step S924. In such a case, the feature quantity extracting unit 192 does not perform any particular process in Steps S907 to S909.

The feature quantity extracting unit 192 calculates each group first feature quantity and each group second feature quantity, for each group, and records the calculated each group first feature quantity and each group second feature quantity in the database 4 in association with an identifier of the group (Step S925).

After Step S925, the image processing device 1 ends the process illustrated in FIG. 10.

In accordance with the processes described above, the image processing device 1 can extract information (group first feature quantities and group second feature quantities) required for reducing operator's effort for recording recording character strings for each group of document slips and accumulate the extracted information in the database 4. In this way, the image processing device 1 can receive an input of image data of a new document slip and automatically record recording character strings included in the document slip in the database 4. As the processes, the processes illustrated in FIGS. 7 and 8 can be used. In the case, when the feature quantity extracting unit 192 acquires a learning result in Step S702 illustrated in FIG. 7, a group is identified, and a learning result (first feature quantity) corresponding to the identified group is acquired. An example of the processing sequence for identifying a group will be described with reference to FIG. 11.

Figure 11:
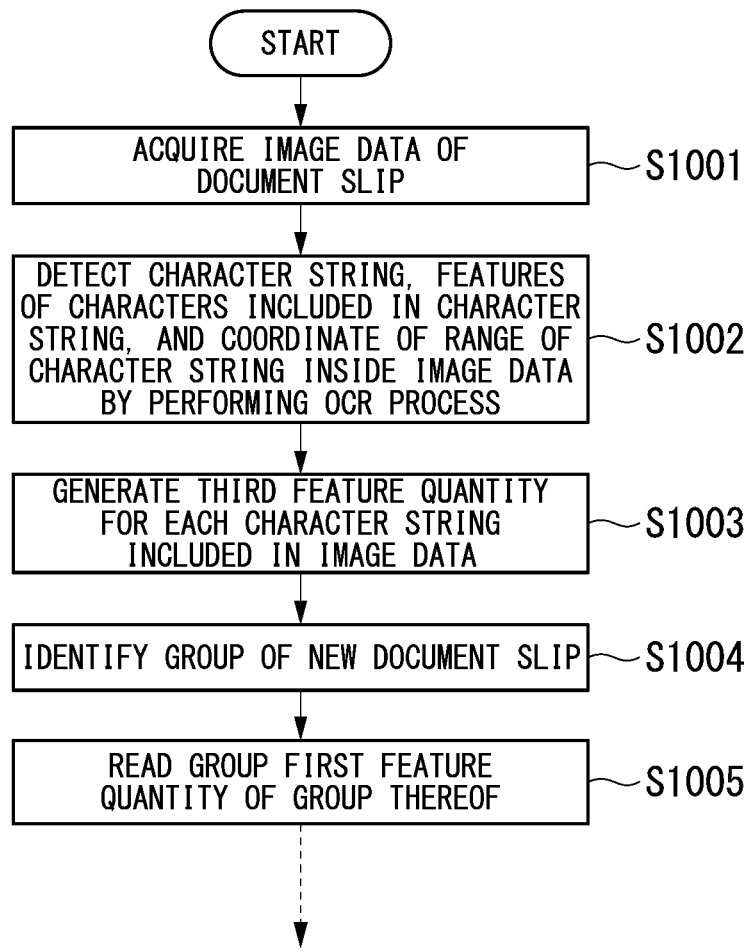
FIG. 11 is a second diagram illustrating the processing flow of an image processing device according to the second embodiment.

FIG. 11 is a second diagram illustrating the processing flow of the image processing device according to the second embodiment.

Step S1001 is common to Step S701 illustrated in FIG. 7. Step S1002 is common to Step S703 illustrated in FIG. 7. Thus, in a case in which the process illustrated in FIG. 11 is performed, the image processing device 1 executes Step S703 before Step S702 as the process illustrated in FIG. 7.

After Step S1002, the feature quantity extracting unit 192 extracts a third feature quantity acquired by quantifying the detected information for each character string included in the image data (Step S1003). The third feature quantity is information that represents a feature of a character string included in a document slip of image data that has been newly read.

Next, the group identifying unit 195 reads a group second feature quantity used for identifying a group of the new document slip among group second feature quantities stored by the database 4. The group second feature quantity, for example, may be a feature quantity corresponding to the emblem image 502 of the ordering person that is displayed in the image data of the document slip. The group identifying unit 195 determines whether information represented in a certain group second feature quantity can be identified from the image data of the document slip acquired in Step S1001. The group identifying unit 195 performs a similar process using a group second feature quantity for all the groups. In a case in which information matching the group second feature quantity read from the database 4 can be identified from the image data of a document slip that has been newly read, the group identifying unit 195 identifies a group having the group second feature quantity as a group of the image data of the document slip that has been newly read (Step S1004). Thereafter, the group identifying unit 195 reads one or a plurality of group first feature quantities for the group from the database 4 (Step S1005). The group first feature quantity is a feature quantity used for identifying one or a plurality of recording character strings included in a document slip belonging to the group.

Step S1005 corresponds to Step S702 illustrated in FIG. 7, and the group first feature quantity indicates an example of a learning result acquired in Step S702. Hereinafter, the image processing device 1 performs the process of Step S704 illustrated in FIG. 7 and subsequent steps using the group first feature quantity.

In this way, the image processing device 1 can automatically record recording character strings included in the image data of the document slip regardless of the type of document slip that has been newly input using image data and recording character strings of the document slip of each of a plurality of formats that have been recorded in advance by an operator. Therefore, the image processing device 1 can reduce operator's effort for recording a recording character string of the document slip.

Third Embodiment

As another example of the process of the image processing device 1, an operator may register a group of document slips in the image processing device 1 in advance. For example, when image data of document slips is registered in past, an operator inputs a group identifier in accordance with a type of document slip and registers the group identifier in the database 4 in association with the image data of the document slip. In this way, there is no mixing of slips of different type inside the same group due to a processing error of the image processing device 1 or the like, and a first feature quantity having a high accuracy can be extracted. In addition, in this case, although a group of a document slip is input by an operator at the time of registration, as in Step S1004, for a new slip, the group is identified using the second feature quantity.

Fourth Embodiment

As another example of the process of an image processing device 1, the image processing device 1 may not only divide document slips into groups using second feature quantities but also divide document slips into groups using first feature quantities or using first feature quantities together with the second feature quantities. Although the first feature quantities are feature quantities of recording character strings, in the case of document slips of the same type, coordinates of recording character strings and character attributes thereof are assumed to be the same, and slips can be divided into groups using the first feature quantities. Initial group division is performed by an operator as illustrated in a fourth embodiment, and new document slips are divided into groups using first feature quantities according to the process of Step S1004. In this way, recording character strings can be read with a high accuracy in an OCR process.

In this case, an acquisition unit 191 acquires a plurality of pieces of slip image data and recording character strings that are recording targets among character strings included in the slip image data. Then, a group classifying unit 194 divides the slip image data into groups on the basis of the first feature quantities. Then, a feature quantity extracting unit 192 extracts recording character strings using first feature quantities corresponding to the slip image data included in a group.

As described above, a recording unit 193 selects a first feature quantity for a document image that is a character recognition target among first feature quantities. The feature quantity extracting unit 192 performs a character recognition process for a document image that is a character recognition target. The recording unit 193 selects a character string of a specific item corresponding to a first feature quantity among character strings acquired as a result of the character recognition process. In a case in which the recording unit 193 has not selected any of character strings acquired as a result of the character recognition as a character string of a specific item, a user determination result acquiring unit 196 acquires a user's determination result indicating whether or not an in-advance input character string matches the character string of the specific item.

In this way, the image processing device 1 can use the character string that has been input in advance as the character string of the specific item. An operator (user) may determine whether or not the in-advance input character string, the character string of the specific item, and the input character string match each other and does not need to be input a character string using keys. From this point, according to the image processing device 1, an operator's burden for checking an result of the OCR process can be reduced not only in a case in which data acquired in advance matches data acquired through the OCR process but also in other cases.

The recording unit 193 selects a first feature quantity that represents the position of the character string of the specific item in the document image. The user determination result acquiring unit 196 presents a document image representing the position of the character string of the specific item and the character string input in advance to a user and acquires a user determination result indicating whether or not the character string of the specific item appearing in the document image and the character string input in advance match each other.

In this way, an operator (user) may determine whether the character string of the specific item appearing in the image of the document slip and the input character string match each other by viewing and comparing them with each other and can perform determination relatively simply. According to the image processing device 1, from this point, the operator's burden is reduced.

In addition, in a case in which the recording unit 193 has not selected any one among character strings acquired as a result of the character recognition as a character sting of a specific item, and a user's determination result indicates that the character string that has been input in advance and the character string of the specific item match each other, the feature quantity extracting unit 192 uses the character string that has been input in advance for machine learning for acquiring information for selecting a character string of the specific item among the character strings acquired as a result of the character recognition.

According to the image processing device 1, from a point that machine learning is performed using a character string checked by the operator, the machine learning can be performed with a high accuracy. In addition, the operator does not need to input a character string using keys at the time of checking, and, from this point, the operator's burden is reduced.

The feature quantity extracting unit 192 performs machine learning in any of a case in which the recording unit 193 has selected any one of character strings acquired as a result of the character recognition process as a character string of a specific item and a case in which any one among the character strings acquired as a result of the character recognition process has not been selected as a character string of a specific item.

In this way, in the image processing device 1, as described above, statistical information of formats of document slips can be applied to the machine learning.

Alternatively, the feature quantity extracting unit 192 performs machine learning in a case in which the recording unit 193 has not selected any one of character strings acquired as a result of the character recognition process as a character string of a specific item and suppresses execution of machine learning in a case in which the recording unit 193 has selected any one of the character strings acquired as a result of the character recognition process as a character string of a specific character.

In such a case, in the image processing device 1, the number of pieces of data stored for machine learning and a time required for the machine learning may be smaller than those of a case in which the feature quantity extracting unit 192 performs machine learning also when the recording unit 193 has selected any one of the character strings acquired as a result of the character recognition process as a character string of a specific item.

Next, the configuration according to the embodiment of the present invention will be described with reference to FIG. 12.

Figure 12:
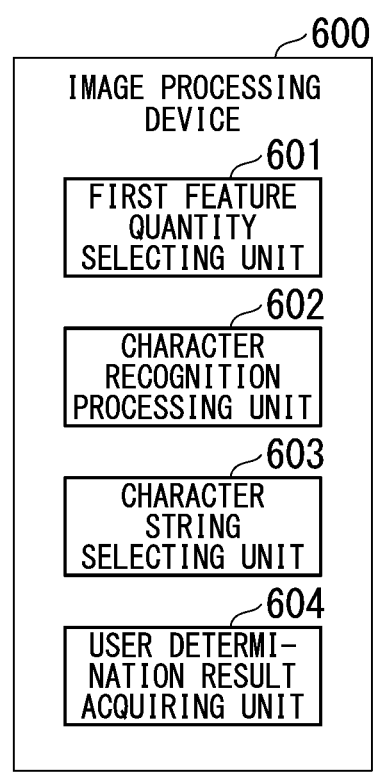
FIG. 12 is a diagram illustrating an example of the configuration of an image processing device according to an embodiment.

FIG. 12 is a diagram illustrating an example of the configuration of the image processing device according to the embodiment. The image processing device 600 illustrated in FIG. 12 includes a first feature quantity selecting unit 601, a character recognition processing unit 602, a character string selecting unit 603, and a user determination result acquiring unit 604.

In such a configuration, the first feature quantity selecting unit 601 selects a first feature quantity for a document image that is a character recognition target among first feature quantities that have been recorded in advance on the basis of a result of the character recognition process for a plurality of document images and represent features of character strings of items for each type and for each specific item of document image. The character recognition processing unit 602 performs a character recognition process for a document image that is a character recognition target. The character string selecting unit 603 selects a character string of a specific item corresponding to the first feature quantity among character strings acquired as a result of the character recognition process. In a case in which the character string selecting unit 603 has not selected any one of the character strings acquired as a result of the character recognition process as a character string of a specific item, the user determination result acquiring unit 604 acquires a user determination result indicating whether or not the character string that has been input in advance matches the character string of the specific item.

In this way, the image processing device 600 can use the character string that has been input in advance as a character string of a specific item. An operator (user) may determine whether or not the in-advance input character string, the character string of the specific item, and the input character string match each other and does not need to be input a character string using keys. From this point, according to the image processing device 600, an operator's burden for checking an result of the OCR process can be reduced not only in a case in which data acquired in advance matches data acquired through the OCR process but also in other cases.

Each device described above includes a computer system therein. A program causing each device to perform each process described above is stored on a computer-readable recording medium of the device, and the process described above is performed by the computer of each device reading and executing this program. The "computer-readable recording medium" described here represents a magnetic disk, a magneto-optical disk, a CD-ROM, a DVD-ROM, a semiconductor memory, or the like.

In addition, this computer program may be distributed to a computer through a communication line, and the computer that has received the distribution may execute the program.

The program described above may be used for realizing part of the functions described above. In addition, the program described above may be a program realizing the functions of each processing unit described above by being combined with a program recorded in the computer system in advance, a so-called a differential file (differential program).

As above, although the embodiment of the present invention has been described in detail with reference to the drawings, a specific configuration is not limited to this embodiment, and a design and the like in a range not departing from the concept of the present invention are included therein.

Priority is claimed on Japanese Patent Application No. 2018-071140, filed Apr. 2, 2018, the content of which is incorporated herein by reference.

INDUSTRIAL APPLICABILITY

According to the present invention, not only in a case in which data acquired in advance and data acquired through an OCR process match each other, but also in other cases, the burden on an operator checking results of the OCR process can be reduced.

REFERENCE SIGNS LIST

1 Image processing device
2 Image reading device
3 Recording device
4 Database
110 Communication unit
120 Display unit
130 Operation input unit
180 Storage unit
190 Control unit
191 Acquisition unit
192 Feature quantity extracting unit
193 Recording unit
194 Group classifying unit
195 Group identifying unit
196 User determination result acquiring unit

The invention claimed is:

1. An image processing device comprising:
at least one memory configured to store instructions; and
at least one processor configured to execute the instructions to:
select a first feature quantity for a document image that is a character recognition target among first feature quantities that are recorded in advance based on a result of a character recognition process for a plurality of document images and represent position information of character strings of an item in the plurality of document images for each type of the document images and for each item;
perform a character recognition process for the document image that is the character recognition target;
select the character string of the item based on a comparison of the position information of the first feature quantity with position information of the character string that is acquired in the document image among the character strings acquired by the character recognition process; and
present the document image representing a position of the character string of the item that is acquired by the character recognition process and a character string of the item that has been input in advance, and acquire a determination result indicating whether or not the character string that has been input in advance of the item matches the character string of the item that is acquired by the character recognition process,
wherein the at least one processor is configured to execute the instructions to present, to a user, the document image representing the position of the character string of the item and the character string that has been input in advance, and acquire the determination result determined by the user, wherein the determination result indicates whether or not the character string of the item appearing in the document image matches the character string that has been input in advance.

2. The image processing device according to claim 1,
wherein the at least one processor is further configured to execute the instructions to:
perform, using the character string that has been input in advance, machine learning for acquiring the first feature quantity used for selecting the character string of the item among the character strings acquired by the character recognition process in a case in which none of the character strings acquired by the character recognition process are selected as the character string of the item, and the determination result indicates of the item that the character string that has been input in advance matches the character string of the item acquired by the character recognition process.

3. The image processing device according to claim 2,
wherein the at least one processor is configured to execute the instructions to:
perform the machine learning in any one of a case in which any one of the character strings acquired by the character recognition process is selected as the character string of the item and a case in which none of the character strings acquired by the character recognition process are selected as the character string of the item.

4. The image processing device according to claim 2,
wherein the at least one processor is configured to execute the instructions to:
perform the machine learning in a case in which none of the character strings acquired by the character recognition process are selected as the character string of the item, and suppress execution of the machine learning in a case in which any one of the character strings acquired by the character recognition process is selected as the character string of the item.

5. An image processing method comprising:
selecting a first feature quantity for a document image that is a character recognition target among first feature quantities that are recorded in advance based on a result of a character recognition process for a plurality of document images and represent position information of character strings of an item in the plurality of document images for each type of the document images and for each item;
performing a character recognition process for the document image that is the character recognition target;
selecting the character string of the item based on a comparison of the position information of the first feature quantity with position information of the character string that is acquired in the document image among the character strings acquired by the character recognition process; and
presenting the document image representing a position of the character string of the item that is acquired by the character recognition process and a character string of the item that has been input in advance, and acquiring a determination result indicating whether or not the character string that has been input in advance of the item matches the character string of the item that is acquired by the character recognition process, wherein the presenting includes presenting, to a user, the document image representing the position of the character string of the item and the character string that has been input in advance, and the acquiring includes acquiring the determination result determined by the user, wherein the determination result indicates whether or not the character string of the item appearing in the document image matches the character string that has been input in advance.

6. A non-transitory computer-readable storage medium storing a program causing a computer to execute processes comprising:

selecting a first feature quantity for a document image that is a character recognition target among first feature quantities that are recorded in advance based on a result of a character recognition process for a plurality of document images and represent position information of character strings of an item in the plurality of document images for each type of the document images and for each item;

performing a character recognition process for the document image that is the character recognition target;

selecting the character string of the item based on a comparison of the position information of the first feature quantity with position information of the character string that is acquired in the document image among the character strings acquired by the character recognition process; and presenting the document image representing a position of the character string of the item that is acquired by the character recognition process and a character string of the item that has been input in advance, and acquiring a determination result indicating whether or not the character string that has been input in advance of the item matches the character string of the item that is acquired by the character recognition process, wherein the presenting includes presenting, to a user, the document image representing the position of the character string of the item and the character string that has been input in advance, and the acquiring includes acquiring the determination result determined by the user, wherein the determination result indicates whether or not the character string of the item appearing in the document image matches the character string that has been input in advance.

* * * * *